W. H. DALTON.
HEATING OVEN.
APPLICATION FILED JAN. 13, 1913.
1,180,247.
Patented Apr. 18, 1916.
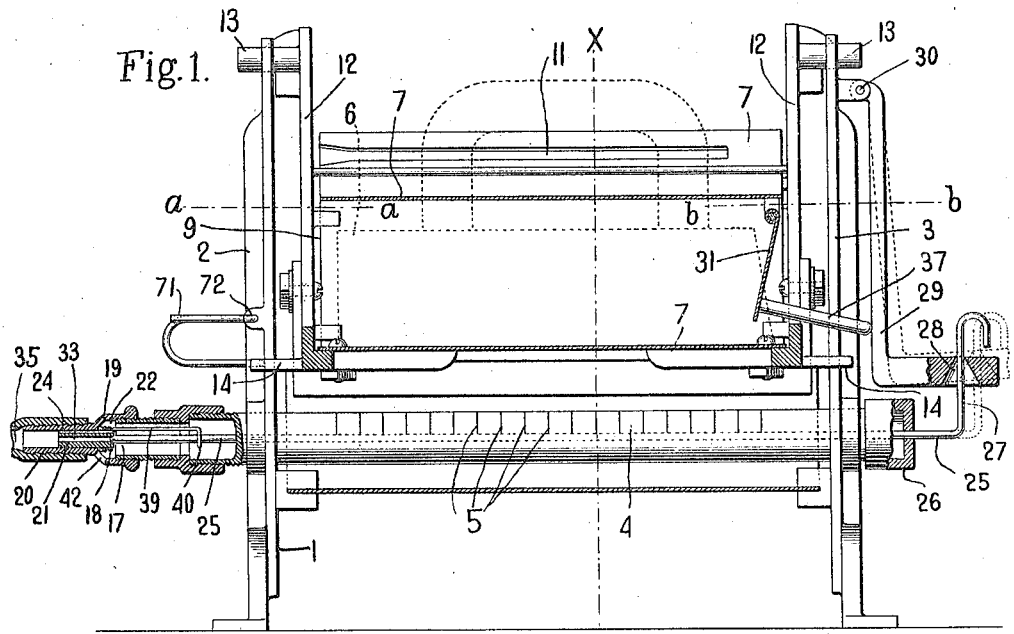
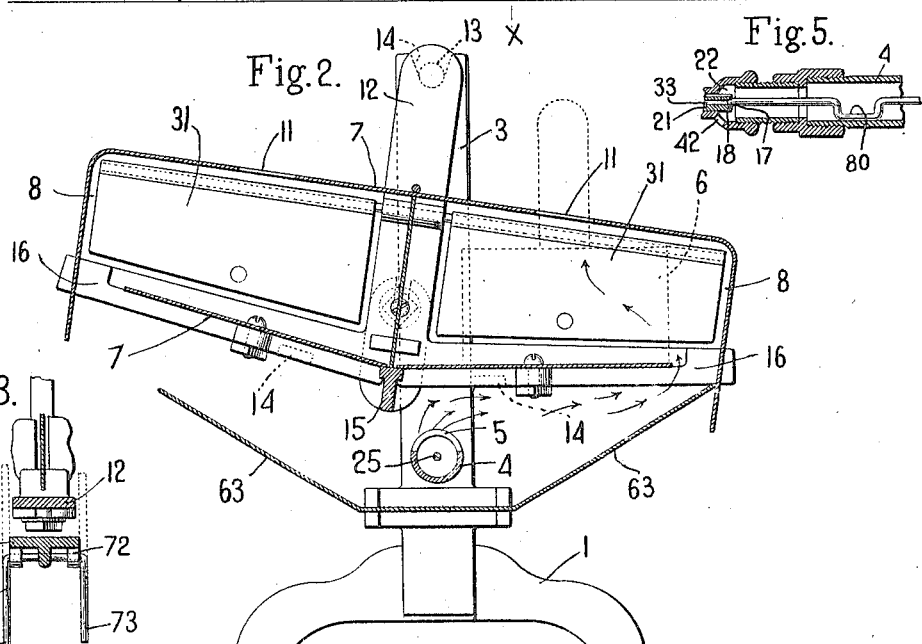
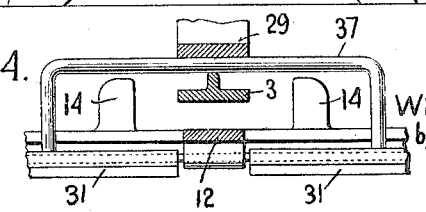
Witnesses.
Thomas Drummond.
Joseph D. Ashe.
Inventor.
William H. Dalton
by Edwards Hand
& Smith
Atty's.

UNITED STATES PATENT OFFICE.

WILLIAM H. DALTON, OF SALEM, MASSACHUSETTS.

HEATING-OVEN.

1,180,247.

Specification of Letters Patent.

Patented Apr. 18, 1916.

Application filed January 13, 1913. Serial No. 741,641.

*To all whom it may concern:*

Be it known that I, WILLIAM H. DALTON, a citizen of the United States, residing at Salem, county of Essex, State of Massachusetts, have invented an Improvement in Heating-Ovens, of which the following description, in connection with the accompanying drawing, is a specification, like characters on the drawing representing like parts.

This invention relates to a heating oven and is of such a nature that it can be applied to an oven adapted for heating soldering irons, sad-irons, curling irons, and various other similar articles.

One of the objects of the invention is to provide a novel device by which the act of placing the tool to be heated in the oven will automatically turn on the gas, while the act of removing the tool from the oven will automatically cut off the main flow of gas while leaving a sufficient flow to maintain the burner ignited.

Another object of the invention is to provide a device of this nature having an oven formed with a plurality of compartments and arranged so that the heat will be deflected automatically into that compartment in which the tool is placed.

In order to illustrate the principle of the invention I have shown it in the drawings as it would be embodied in a device for heating sad-irons, but I wish to state that the invention is equally applicable for heating other tools, such as soldering irons, curling irons, etc., by merely changing the shape or dimensions of the oven to correspond to the shape and size of the tool to be heated. I wish it clearly understood, however, that the invention is not limited to the particular use herein illustrated.

Referring to the drawings, Figure 1 is a side elevation partly in section of a device embodying my invention; Fig. 2 is a section on the line $x$—$x$, Fig. 1; Fig. 3 is a section on the line $a$—$a$, Fig. 1; Fig. 4 is a section on the line $b$—$b$, Fig. 1; Fig. 5 is a fragmentary sectional view showing a different form of guide for the valve stem than that shown in Fig. 1.

The embodiment of the invention herein illustrated comprises a frame 1 having two uprights 2, 3 at the ends thereof from which the oven, presently to be described, is supported. The oven is heated by a burner tube 4 which is sustained by the frame and which is provided in its upper edge with burner slits 5 as usual. The oven which I employ may be a single oven, that is, one having a single compartment for receiving a single tool, or may be an oven having a plurality of compartments according to the use to which the device is to be put. In the drawings I have shown an oven having two compartments, each of which is adapted to receive a sad-iron 6. Where the oven is thus made with a plurality of compartments I prefer to pivotally sustain it from the standards 2, 3, so that it can have a sufficient swinging movement to permit either compartment to be swung into position to be heated by the burner.

The oven is shown at 7, and it may be made of sheet iron or any other suitable material. It is formed with the two compartments 8, each of which is adapted to receive a sad-iron 6. These compartments are each open at one end, as shown at 9, to permit the sad-iron to be entered into the oven, and the top of each compartment is provided with a slot 11 to receive the handle of the sad-iron. The oven is shown as provided at each end with the upwardly-directed arm 12, and each arm has at its upper end the latterly-projecting trunnion 13 which rests in a notch 14 formed in the top of the standard 2 or 3. The oven is thus suspended from the top of the standards in such a way as to permit it to swing laterally. One of the arms 12 has extending therefrom two stop fingers 14 which embrace the standard 3, said fingers operating to limit the swinging movement of the oven. When there is no sad-iron in the oven, then it will hang centrally. If, however, a sad-iron is put into either compartment 8, then since the weight of the sad-iron is at one side of the line of suspension, the weight of the sad iron will swing the oven laterally as far as the stop 14 will permit.

Situated beneath the oven is a deflector 15 and the oven will preferably have openings 16 in its floor so as to permit the hot gases to pass into the compartments. The deflector 15 is so arranged that when the sad-iron occupies either of the compartments 8 and the oven is swung laterally, as far as permitted by one of the stops, said deflector will occupy a position at one side of the burner, as shown in Fig. 2, and will thereby deflect all the heat generated from the burner into the compartment which is occupied by the iron. If the iron is placed in the other compartment from what is shown in Fig. 2, then the oven will be swung laterally in the opposite direction and the deflector will be carried to the other side of the burner tube, as will be obvious. It will thus be seen that with my arrangement whenever there is only one said-iron in the oven the heat will be deflected into the compartment occupied by the sad-iron and thus no heat will be lost through the unoccupied compartment. The frame 1 supports two wings 63, one on each side thereof which act as additional means for deflecting the hot products of combustion into the compartment 8. These wings are so constructed as will be seen, from Fig. 2, that when the oven 7 is swung to either side the edge of one wing is brought against the side of the oven. This is clearly shown at the right-hand side of Fig. 2 and the wing 63, therefore, prevents the escape of the products of combustion around the lower edge of the side of the oven. This same construction may be used in connection with ovens adapted to heat other implements than said-irons, for it will be readily seen that by making the compartments of the proper size and shape, curling irons, or soldering irons, or other similar tools can be heated.

Another feature of the invention relates to a means whereby the insertion of the tool into the oven will turn the gas on, while the withdrawal of the tool will result in cutting the supply of gas down to a minimum, thus making it unnecessary for the operator to manipulate any valves to prevent the consumption of gas at such times as no heat is required. With my device it will be impossible to keep the burner going with a full flame at such times when there is nothing in the oven, and, therefore, all waste of gas is prevented.

The supply of gas to the burner is controlled by a valve 17 which is adapted to engage a valve seat 18 formed at the end of a main gas duct 33. This duct 33 is shown as formed in a coupling member 19 which is adapted to be screwed onto the end of the burner tube 4 and is provided with the nipple 20 to receive the end of a rubber gas pipe 35. This coupling 19 also constitutes the air-mixing device through which the air is admitted to the burner tube to produce the blue flame desired. In the embodiment herein shown the valve seat 18 is formed in the end of a plug 21 through which the main gas duct 33 passes and which is secured in the fitting 19, said plug projecting into the mixing chamber 22 of the fitting, as seen clearly in Fig. 1. This fitting is provided with an air inlet port 42 through which air is admitted to the burner tube. The plug 22 is provided with a by-pass port 24 through which gas passes when the valve 17 is closed and which supplies sufficient gas to maintain the burner in operation with a very small flame.

The operation of the valve 17 is controlled by the insertion or removal of a tool or implement from the oven, and to effect this, I provide said valve with a stem 25 which extends longitudinally through the burner tube 4 and through the cap 26 at the end thereof, and which is bent upwardly at its end, as at 27, said upwardly-bent end extending through an aperture 28 in a swinging gravity-actuated member 29 that is pivoted to the upright 3 at 30. Means are provided whereby when the sad-iron is inserted into either compartment 8 the entering movement of the sad-iron will cause the gravity-actuated member 29 to swing outwardly away from the standard 3 and because of the connection between said member and the stem 25 of the valve this movement thereof will withdraw the valve from its seat, thus opening the main gas duct or port 33, while when the sad-iron is withdrawn from the compartment the weight of the member 29 will swing it into the position shown in Fig. 1, thus causing the valve 17 to close the duct 33. At such time there will be sufficient gas leaking through the by-pass port 24 to maintain the burner in operation, although with a very small flame. This outward movement of the member 29 against the action of gravity whenever a sad-iron is inserted in the oven may be provided for in various ways, but where the swinging oven is employed I prefer to provide the latter with two swinging plates 31, one at the end of each compartment, so that when a sad-iron is placed in either compartment 8 it will engage the corresponding plate 31. These swinging plates 31 are shown as connected by a yoke 37 which extends around the standard 3 and has engagement with the member 29. Whenever during the act of placing a sad-iron, soldering iron, or other tool in the compartment 8, said tool or implement engages either swinging plate 31, the movement of the latter will be communicated to the weighted member 29 and through said member to the valve thereby opening the valve to allow a full flow of gas, while when the tool is removed from the oven, the weight of the member 29 will cause the valve to be seated on the seat 18. With my device, therefore, the supply of gas to the burner is automatically controlled and a full supply will be provided so long as there is a tool in the oven to be heated, and while a minimum supply will be provided when the oven is empty.

I will preferably place the air inlet opening 42 on the opposite side of the fitting 19 from the by-pass plug 24, as I find that by so doing there is no danger that the flame will go out when it is reduced to the minimum which the amount of gas flowing through the duct 24 will produce.

In order to support and guide the valve 17 I have herein shown a guiding member in the form of a wire 39 which is sustained on the end of the plug 21 and is provided at its outer end with a guiding loop 40 through which the valve stem loosely passes.

It is sometimes desirable to lock the oven in its central position, and to accomplish this, I provide the locking device 71 which is pivoted to the standard 2 at 72 and is provided with the two fingers 73 which can be inserted over into the dotted line position Fig. 3, thereby to embrace the upright 12 of the oven.

One of the important features of my invention lies in the fact that I do not use a pilot light, but that on the contrary, I employ the by-pass duct 24 which leads directly into the burner tube 4. As a result the flame developed in the burner tube will either be high or low, depending on whether the gas is admitted through the main duct 33 and the by-pass 24, as will be the case when the valve is opened, or through the by-pass duct alone.

In the illustrated embodiment of my invention the frame which supports the oven comprises two end frame portions provided with the uprights 2 and 3 which are connected by the burner tube 4, said burner tube providing means for holding the end frames in proper position.

In lieu of the guide shown in Fig. 1 for the valve stem I may employ the construction shown in Fig. 5 wherein the valve stem is provided with the lateral extension 80 that engages the wall of the burner tube.

Having fully described my invention, what I claim as new and desire to secure by Letters Patent is:—

1. In a heating oven, the combination with a heating compartment, of a burner tube for heating the compartment, a member secured to said tube and provided with a main gas duct and a by-pass port, both leading to the interior of the burner tube, a valve for closing the main duct, said valve having a stem which extends through the burner tube, a horizontally swinging plate in the oven compartment adapted to be actuated by the article inserted in the oven, and means whereby the horizontal swinging movement of the plate in one direction opens the valve.

2. In a heating oven, the combination with an oven chamber, of a burner tube for heating the latter, a valve to control the supply of gas thereto, said valve having a stem that extends longitudinally through the burner tube, a horizontally swinging plate in said chamber adapted to be actuated by the device to be heated as it is placed in the oven, a gravity-actuated member connected with the valve stem and operating normally to hold the valve closed, and means whereby the horizontal swinging movement of the plate actuates said gravity-actuated member thereby to open the valve.

3. In a heating oven, the combination with an oven chamber, of a burner tube for heating the latter, a valve to control the supply of gas to the burner, said valve having a stem which extends longitudinally through the burner tube, a gravity-actuated member connected to said stem, a horizontally swinging plate in the end of the oven against which the device to be heated impinges as it is inserted in the oven, and means whereby the horizontal swinging movement of said plate operates the gravity-actuated member thereby to open the valve.

4. In a heating oven, the combination with an oven compartment, of a burner tube for heating the latter, a valve to control the supply of gas to the burner, a pivotally-mounted gravity-actuated member connected to the valve, said member normally maintaining the valve closed, a swinging plate associated with the oven chamber and separate from said gravity-actuated member, said member situated to be engaged by the device to be heated as it is inserted into the oven, and means whereby swinging movement of said plate operates the gravity-actuated member against the action of gravity thereby to open the valve.

5. In a heating oven, the combination with an oven having a plurality of compartments, of a burner for heating said compartments, means for sustaining said oven for lateral movement whereby either compartment may be brought over the burner, a valve to control the supply of fuel to the burner, and means common to both compartments and operative in either position of the oven to open said valve by the insertion of a device to be heated into either compartment.

6. In a device of the class described, the combination with an oven having a plurality of compartments, of means for pivotally suspending said oven so that it can swing laterally, a burner tube situated beneath the oven whereby when a device to be heated is placed in either compartment the weight thereof will swing the oven to bring said compartment over the burner, a valve to control the supply of fuel to the burner, and means common to both compartments and operative in either position of the oven to open said valve by the insertion of a device to be heated into either compartment.

7. In a device of the class described, the combination with an oven having a plurality of compartments, of means for pivotally suspending said oven so that it can swing laterally, a burner tube situated beneath the oven whereby when a device to be heated is placed in either compartment the weight thereof will swing the oven to bring said compartment over the burner, and a deflector carried by the oven and acting to deflect the heat from the burner into the occupied compartment.

8. In a device of the class described, the combination with a frame having end uprights, of an oven provided with two compartments, arms extending upwardly from said oven and pivotally connected at their upper ends to the uprights of the frame whereby said oven is suspended from above and can swing laterally, and a burner tube beneath the oven, the weight of the device to be heated in either compartment swinging said oven laterally to bring said compartment over the burner.

9. In a device of the class described, the combination with two separate independent end frames, of a burner tube connecting said end frames, an oven sustained by the end frames, a valve to supply gas to said burner tube, and means adapted to be actuated by an article inserted in the oven for opening the valve, said means operating to automatically close the valve when the article is removed from the oven.

In testimony whereof, I have signed my name to this specification, in the presence of two subscribing witnesses.

WILLIAM H. DALTON.

Witnesses:
  Louis C. Smith,
  Bertha F. Heuser.

Copies of this patent may be obtained for five cents each, by addressing the "Commissioner of Patents, Washington, D. C."